May 31, 1966 J. G. WARHOL 3,253,508
TWO PHASE ADJUSTABLE ANTI-GLARE REAR VISION MIRRORS
Filed April 6, 1962 4 Sheets-Sheet 1
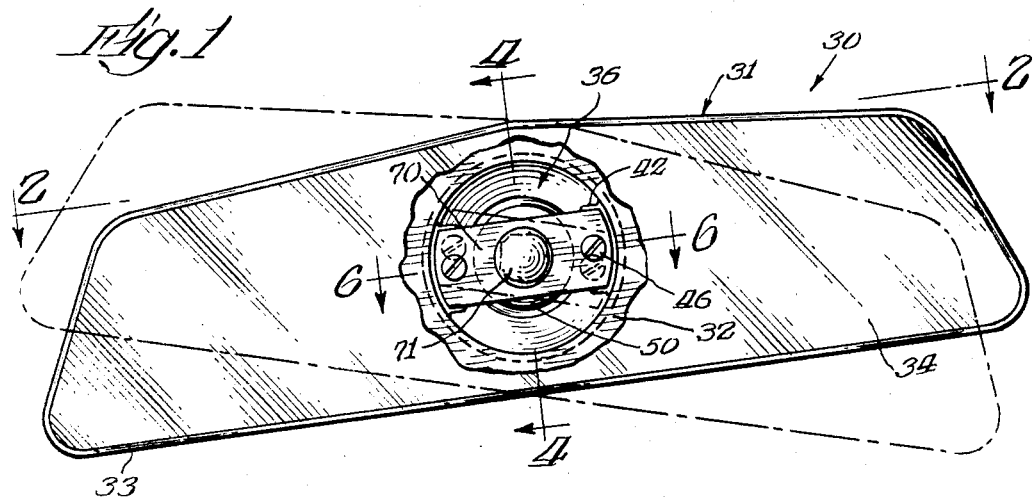
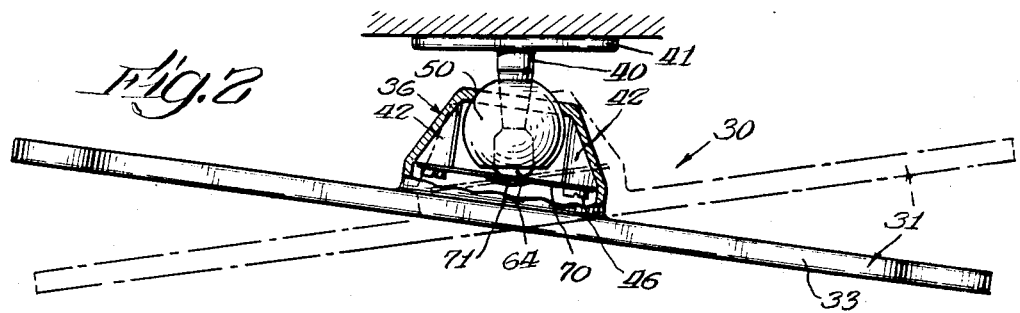
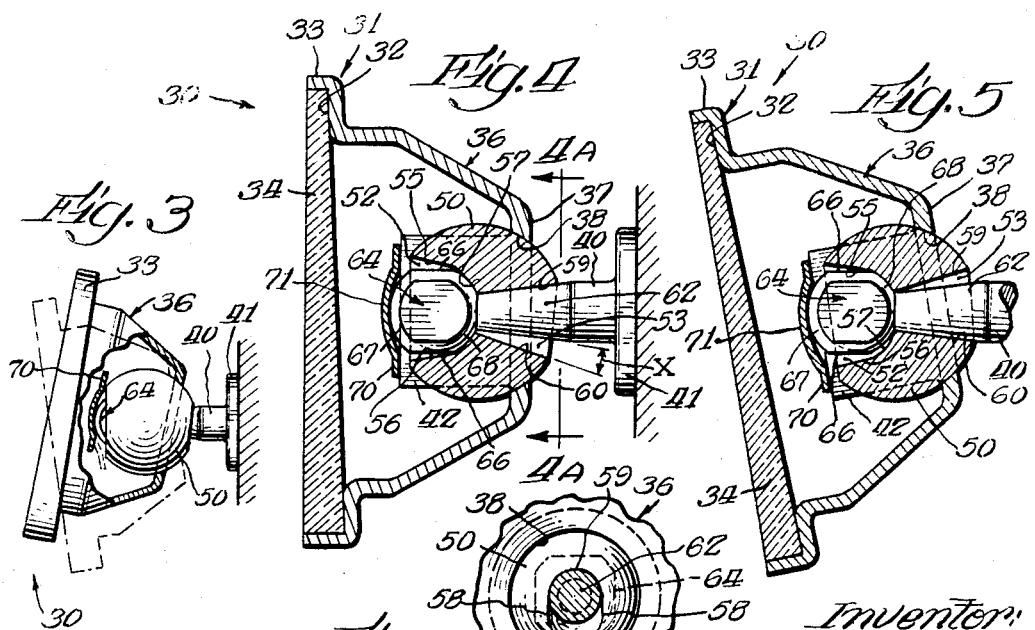
Inventor:
John G. Warhol
By [signature] ATTY.

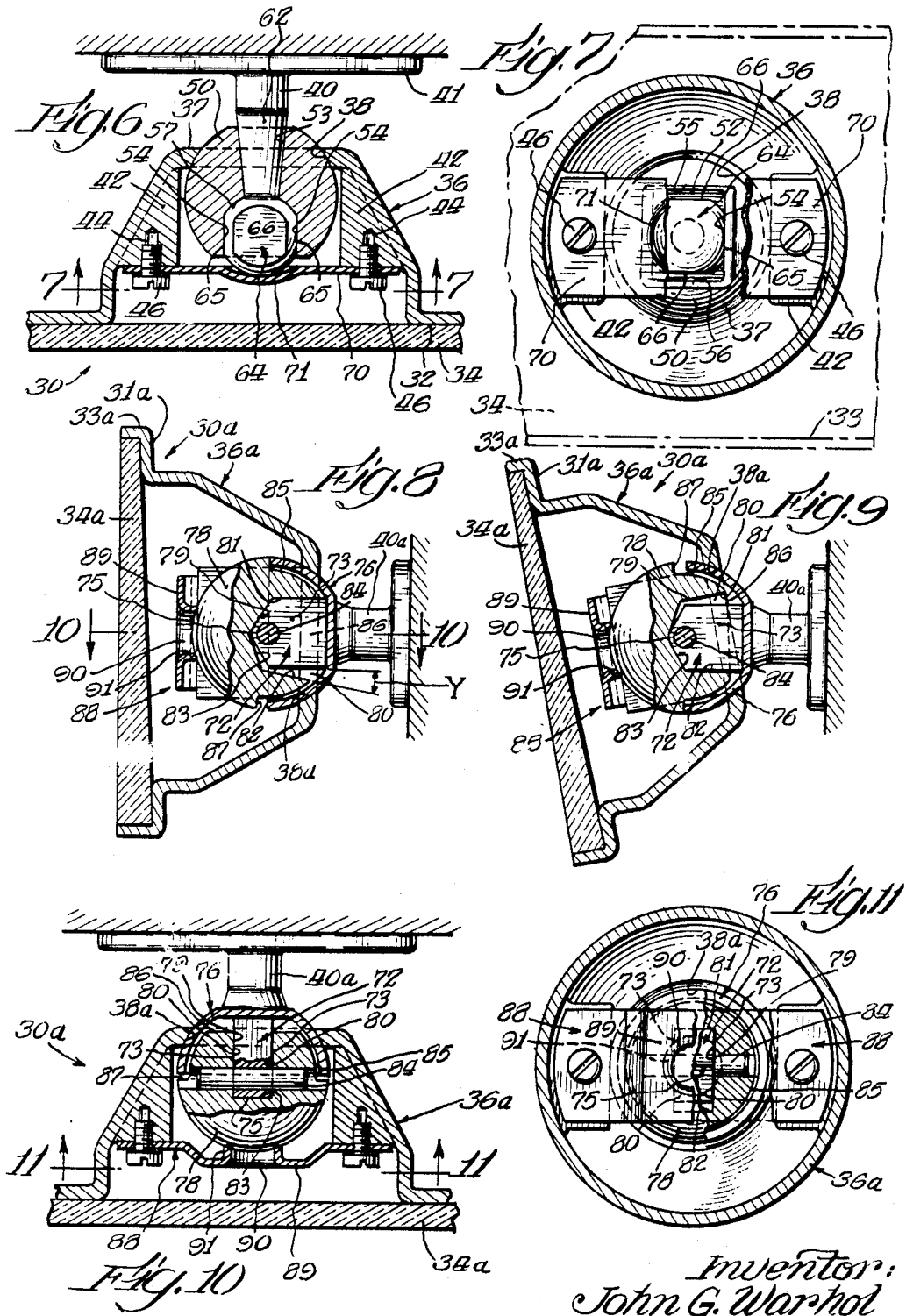

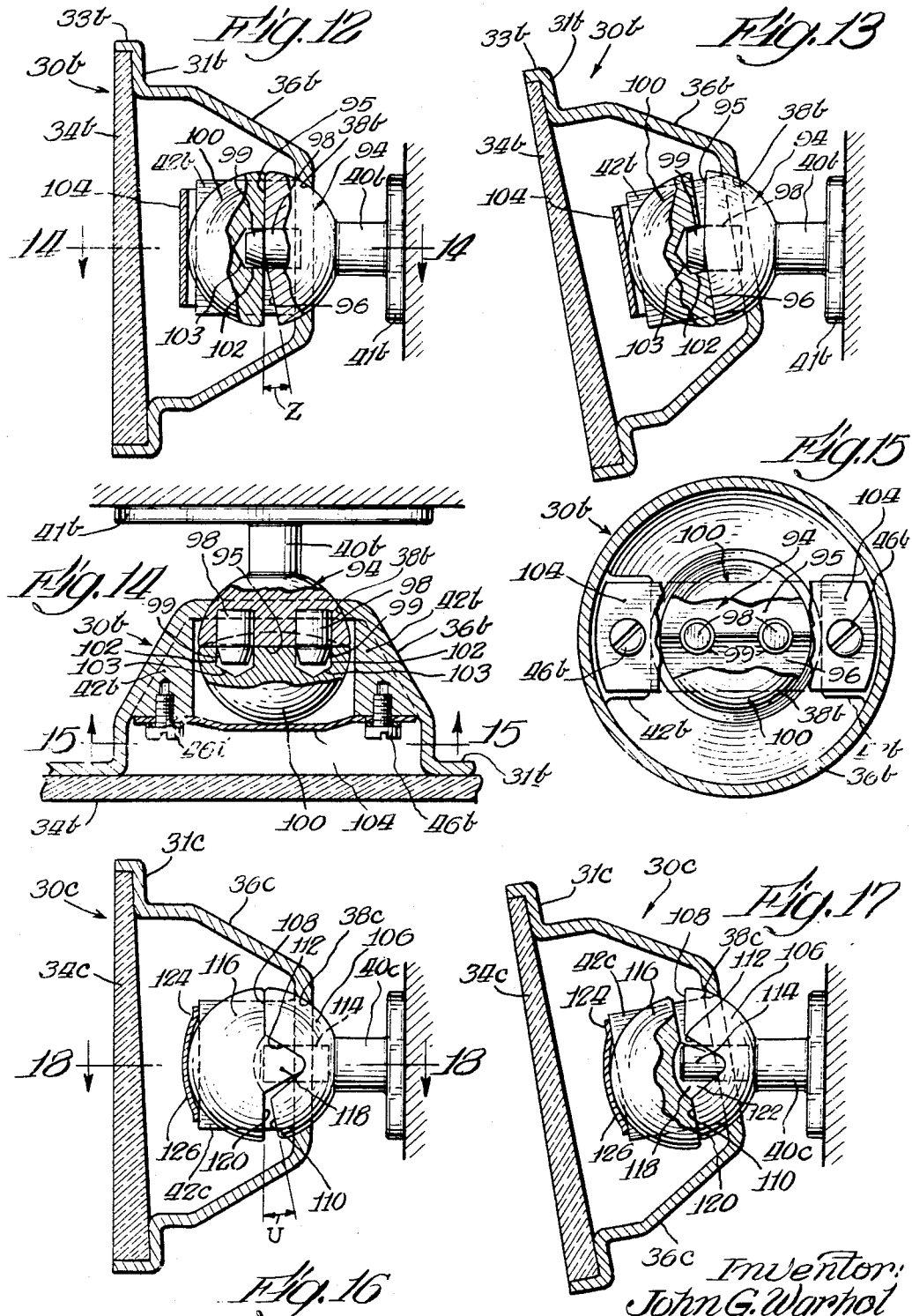

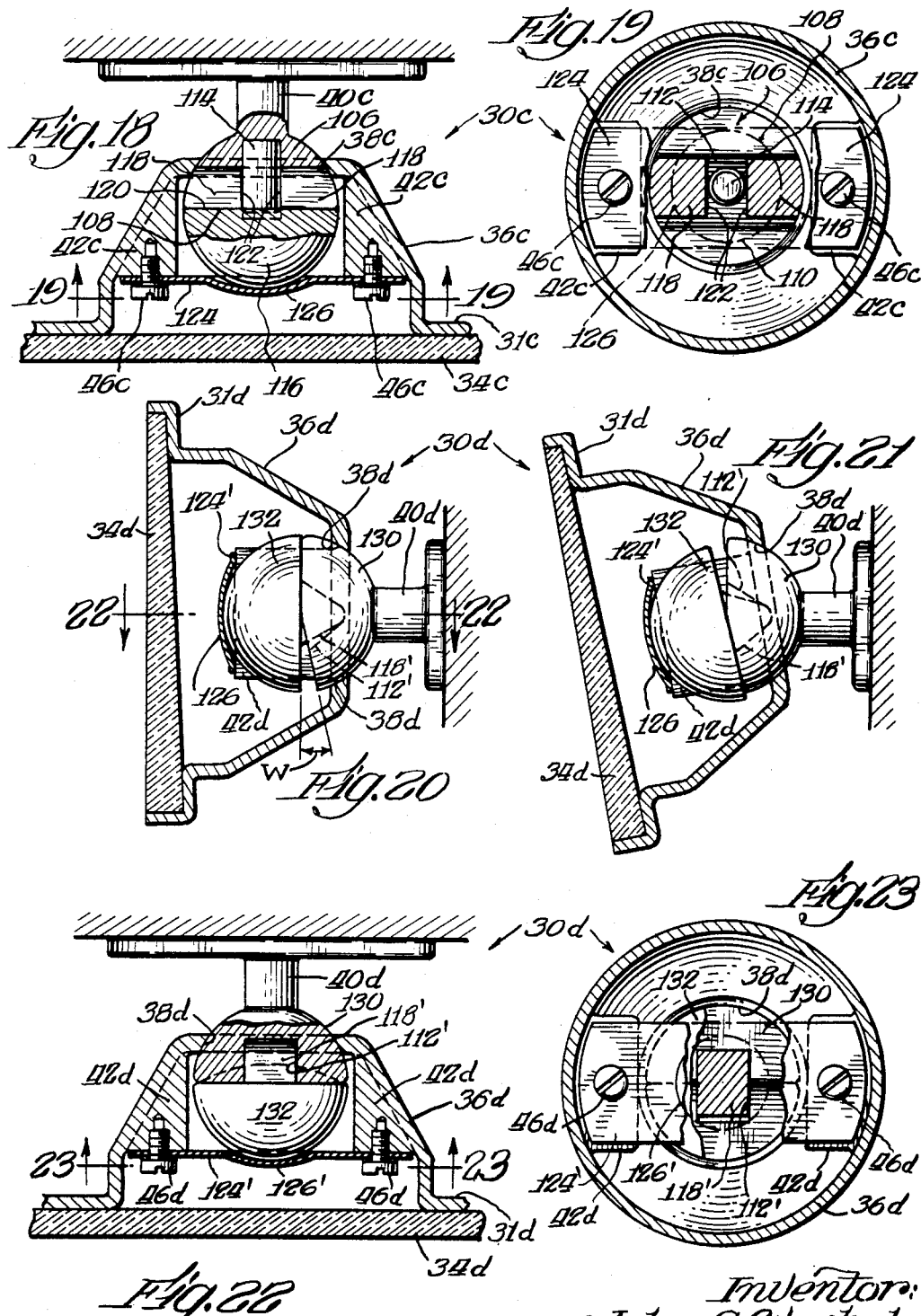

United States Patent Office 3,253,508
Patented May 31, 1966

1

3,253,508
TWO PHASE ADJUSTABLE ANTI-GLARE REAR
VISION MIRRORS
John G. Warhol, Oak Park, Mich., assignor to Nelmor
Corporation, Harper Woods, Mich., a corporation of
Illinois
Filed Apr. 6, 1962, Ser. No. 185,562
16 Claims. (Cl. 88—77)

This invention relates to an adjustable anti-glare rear vision mirror, and more particularly to a rear vision mirror adapted for both day and night driving.

One of the objects of this invention is to provide a rear vision mirror in which the mirror unit as a whole is adjustable to an angle and level as to properly reflect the view from the rear window of the car to the eyes of the driver, which may be termed as the first phase adjustment, and wherein the mirror unit is also adjustable to either of two selective positions to observe images of different intensity, which may be termed as the second phase adjustment, both the first and second phase adjustments being effected solely by manual force applied to the mirror unit.

Rear view mirrors common in the art and on the market are adjustable as a whole and are also adjustable to either of two selective positions, however, such mirrors require the use of levers, rotatable members, or the like, for effecting adjustment to the two selective positions.

With this invention, levers and other auxiliary manually engaged means for selectively adjusting the mirror to two different positions for reflecting images of different intensity are eliminated and in accordance with this invention there is provided a mirror unit which is adjustable in the first phase and in the second phase merely by the application of manual force applied directly to the mirror unit, as by a person's hand engaging the mirror unit. The force necessary for pivoting the mirror unit in the second phase to either of the two selective positions is very insignificant, in the order of three pounds per square inch, whereas the manual force or pressure for the adjustment of the mirror unit as a whole in the first phase requires a manual force of approximately ten pounds per square inch.

Another object of this invention is to provide an adjustable anti-glare rear vision mirror in which the mirror unit as a whole may be adjusted merely by the application of a certain amount of manual pressure applied against the mirror unit, which adjustment remains fixed until such time as again readjusted by the same amount of manual pressure, and wherein the mirror unit may also be adjusted to two limited selective positions principally for reflecting the intensity of the image, the more limited adjustment between the two selective positions being effected by a manual pressure on said mirror unit less than that necessary to effect the adjustment of the mirror unit as a whole.

Another object of this invention is to provide an anti-glare rear vision mirror which has two independent and separate phases of adjustment, both accomplished by manual pressure on the mirror unit, the first phase of adjustment being effected by a greater degree of manual pressure on the unit wherein the mirror unit as a whole is adjusted to the proper angle and level of the vision of the driver, and the second phase of adjustment wherein the mirror unit is flipped back and forth manually to either of two selective positions by the application of a very minimal amount of manual pressure on said mirror unit, all being effected without the use of any levers or other extraneous operating elements.

Another object of this invention is to provide a rear vision mirror of the foregoing character which is eco-

2 nomical to produce, which is very attractive in appearance and which is readily operable merely by the application of manual pressure on the unit.

Other objects and advantages will become apparent as this description progresses.

In the drawings:

FIGURE 1 is a front elevational view with a portion of the mirror reflector broken away to show a portion of the interior.

FIGURE 2 is a view partly in section taken on lines 2—2 of FIGURE 1. The dotted lines in FIGURES 1 and 2 show an adjustment of the mirror unit as a whole.

FIGURE 3 is a side elevational view partly in section showing in dotted lines the adjustment of the mirror unit as a whole.

FIGURE 4 is a sectional view taken on lines 4—4 of FIGURE 1, showing the reflective mirror unit in one of its two selective positions.

FIGURE 4A is a view taken on lines 4A—4A of FIGURE 4.

FIGURE 5 is a view similar to FIGURE 4, with the mirror unit tilted and showing the other selective position.

FIGURE 6 is a sectional view taken on lines 6—6 of FIGURE 1.

FIGURE 7 is a view taken on lines 7—7 of FIGURE 6.

FIGURES 8 to 11 inclusive show a modification in which:

FIGURE 8 is a sectional view taken on lines corresponding to FIGURE 4;

FIGURE 9 is a view corresponding to FIGURE 8, with the mirror unit tilted;

FIGURE 10 is a view taken on lines 10—10 of FIGURE 8, and

FIGURE 11 is a view taken on lines 11—11 of FIGURE 10.

FIGURES 12 to 15 inclusive show another modification in which:

FIGURE 12 is a sectional view of said modification taken on lines corresponding to FIGURE 4;

FIGURE 13 is a view corresponding to FIGURE 12, with the mirror unit tilted;

FIGURE 14 is a view taken on lines 14—14 of FIGURE 12, and

FIGURE 15 is a view taken on lines 15—15 of FIGURE 14.

FIGURES 16 to 19 inclusive show another modification in which:

FIGURE 16 is a view partly in section of said modification, taken on lines corresponding to FIGURE 4;

FIGURE 17 is a view corresponding to FIGURE 16, with the mirror unit tilted;

FIGURE 18 is a view taken on lines 18—18 of FIGURE 16, and

FIGURE 19 is a view taken on lines 19—19 of FIGURE 18.

FIGURES 20 and 23 inclusive show another modification in which:

FIGURES 20 to 23 inclusive show another modification, taken on lines corresponding to FIGURE 4;

FIGURE 21 is a view corresponding to FIGURE 20, with the mirror unit tilted;

FIGURE 22 is a view taken on lines 22—22 of FIGURE 20, and

FIGURE 23 is a view taken on lines 23—23 of FIGURE 22.

Reference will now be made to FIGURES 1 to 7 inclusive, which show one embodiment.

The mirror assembly or mirror unit generally indicated at 30 includes a generally rectangular-shaped supporting plate 31 having a front flat wall surface 32 bounded by a forwardly extending lip or flange 33 in which is seated a prismatic reflective mirror generally indicated at 34. Extending rearwardly of the supporting plate 31 and preferably formed integrally therewith is a rearwardly offset portion which forms the housing 36 for certain of the parts.

The rear wall 37 of the housing 36 is provided with a central opening 38 which forms a socket opening to accommodate a member supported on the supporting arm or stem 40 which is secured to a bracket 41, which in turn is attached to an automobile, as is well known.

The interior of the housing 36 is provided with spaced bosses 42, each of which has a threaded opening 44 to receive threaded fastening elements 46 or the like for the purpose of retaining a spring member which bridges the member supported on the arm or stem or member associated therewith and provides a pressure contact with same. The spring member may be secured by any other means, such as pinning, staking, and the like.

The aforementioned structure is common to all of the embodiments and will not be redescribed.

The member supported on the arm or stem and the spring means differ from embodiment to embodiment and each will be described in detail. With respect to the similar parts in the various embodiments, they will be identified by the same numeral followed by a different letter for each embodiment. Thus, for example, the mirror assembly or mirror unit in the second embodiment shown in FIGURES 8 to 11 inclusive will be identified as 30a, and the mirror assembly or mirror unit in the third embodiment shown in FIGURES 12 to 15 inclusive will be identified as 30b, and so forth. Only those portions which differ from each other will be described in particular and will be designated by different numerals.

Referring again to FIGURES 1 to 7 inclusive, a spherical shaped member generally designated at 50 is supported in the socket opening 38. The spherical member is provided with a front bore 52 which communicates with a rear bore 53. The front bore 52 has flat parallel spaced side walls 54 and top and bottom walls 55 and 56 which slope inwardly toward each other from the mouth of the bore and then curve sharply inwardly to form a rear seat 57 for the head on the arm or stem, to be presently described. The rear bore 53 has a pair of flat spaced side walls 58 (FIGURE 4A) and arcuate shaped connecting top and bottom walls 59 and 60; all of said walls incline or taper outwardly from the center adjacent the rear of the front bore toward the rear.

The supporting arm or stem, heretofore generally designated at 40 is attached to the bracket 41 which is suitably secured to the automobile, as is well understood. The arm 40 used in connection with this embodiment has an annular tapering shaped neck portion 62 which extends into the rear bore 53, but is of a reduced dimension to permit pivoting or tilting of the spherical member 50 from the FIGURE 4 to the FIGURE 5 position and vice versa.

The arm or stem 40 has a head 64 which has a transverse cross-sectional configuration generally similar to the front bore 52. The head 64 has parallel spaced flat side walls 65 and flat spaced parallel top and bottom walls 66. The front and rear 67 and 68 of the head are each of arcuate shape. The rear of the head rests against the seat 57 of the front bore 52. The front arcuate portion 67 of the head extends outwardly and forwardly of the front bore 52 and is engaged by the spring 70 which has a seat portion 71 engaging said arcuate portion 67 of the head to provide frictional contact therewith. As best seen in FIGURES 4 and 5, the spring seat 71 and the arcuate portion 67 of the head 64 are not of the same radius. The radius of the seat 71 of the spring is at the rear of the head where it connects with the neck 62.

The mirror assembly or mirror unit 30 may be flipped, tilted or pivoted to either of its two selective positions for reflecting to an observer images of different intensity by a slight manual pressure on the mirror unit of approximately three p.s.i. This will sometimes be hereinafter referred to in connection with this and the other embodiments as a second phase adjustment. This flipping or tilting changes the angle of the prismatic reflector mirror to either of the positions shown in FIGURES 4 and 5.

For example, with the mirror in the FIGURE 4 position, the prismatic mirror 34 is flipped to the FIGURE 5 position by a slight downward manual pressure as by the hand engaging anywhere on the mirror unit 30 and tilting it downward. The friction between the spherical member 50 and the casing 36 is greater than the friction between the head 64 and the spring 70, therefore, a slight downward manual pressure on the mirror unit of approximately three p.s.i. will cause the spherical member 50 to pivot or tilt downward on the arm 40, from the FIGURE 4 to the FIGURE 5 position.

The supporting plate 31, mirror 34, casing 36, and spring 70 which is fixedly attached to the casing through the bosses 42, all move as an integral unit with the pivoting of the spherical member 50, with respect to the stationary arm 40 and head 64. The spring 70 will move over the arcuate portion 67 of the head 64 to allow the spherical member 50 to move the distance from the FIGURE 4 to the FIGURE 5 position on the stationary arm 40. This changes the angle of the prismatic mirror 34.

To tilt the unit to the up or FIGURE 4 position from the FIGURE 5 position, a slight upward manual pressure of approximately three p.s.i. is applied to the mirror unit 30 and the reverse movement takes place. Thus, with a slight manual pressure the unit 30 is flipped to either of its two selective positions, thereby changing the prismatic miror to reflect images of different intensity, as is well known. The degree of tilt or angular change is always fixed and is defined by the relative movement of the spherical member 50 with respect to the arm 40. This is indicated by the angle X in FIGURE 4.

To adjust the mirror unit as a whole to such an angle as to properly reflect the view from the rear window of the automobile to the eyes of the driver and also the level of the mirror, a greater manual pressure is applied to the mirror unit 30 to overcome the friction between the spherical member 50 and housing 36. A pressure on the order of approximately ten p.s.i. is necessary for this purpose. With the greater manual pressure, the housing 36 is adjusted or moved relative to the spherical member 50 to change their relative positions. This changed position will remain fixed until again readjusted and will not be affected by the tilting or pivoting of the spherical member 50 relative to the arm 40. The adjustment of the mirror unit 30 as a whole will sometimes be hereinafter referred to in connection with this and the other embodiments as the first phase adjustment.

It will be understood that normally the mirror unit 30 is adjusted as a whole for the driver's vision and this usually remains set for that particular driver; that is why it is referred to herein as a first phase adjustment. The pivoting or flipping of the mirror unit 30 to the two selective positions, sometimes referred to herein as the second phase adjustment, takes place frequently during the course of driving, particularly at night, and is subsequent to the first phase adjustment.

Changing the position of the casing 36 relative to the spherical member 50 would likewise change the position of the spring 70 and spring seat 71 relative to the stationary head 64. However, after the change has been made, the unit 30 may be flipped vertically as previously described to its two flipping postions.

FIGURES 8 to 11 inclusive will now be described.

The parts which are identical to the parts described in connection with FIGURES 1 to 7 will bear the same numeral followed by the letter "a" and will not be redescribed in detail.

The supporting arm 40a has a head 72 provided with spaced flat side walls 73 and spaced flat top and bottom walls and a V-shaped front end 75. A hemi-spherical shaped shell 76 is secured to the arm 40a rearwardly of the head 72 and said shell 76 extends into the rear housing socket opening 38a. A generally spherical shaped member 78, having a rearwardly facing bore 79 of the same general configuration of the head 72 with flat spaced parallel side walls 80, slightly diverging top and bottom walls 81 and 82, and a V-shaped front end wall 83, is provided to accommodate the head 72 on the arm 40a. A cross-pin 84 pivotally connects the spherical shaped member 78 with the head 72 for a vertical pivotal movement of the spherical member 78 between the positions shown in FIGURES 8 and 9. The rear half of the spherical member 78 has a reduced arcuate surface 85 and a flat rear wall 86 to accommodate the shell 76 which makes frictional contact with the housing 36a. An annular shoulder 87 is provided between the front and rear portion of spherical member 78.

The spring member 88 is provided with a forwardly extending central offset portion 89 having a central opening 90 bounded by an inwardly extending annular lip or flange 91 which is in frictional engagement with the front of the spherical member 78. The operation is as follows.

The friction between the flange 91 of the spring 88 and the spherical member 78 is greater than the friction at the pivotal connection of the cross-pin 84 on the head 72 and spherical member 78, thus, a slight pressure of about three p.s.i. on the mirror unit 30a will tilt it from the FIGURE 8 to the FIGURE 9 position, wherein the spherical member 78 will pivot on the cross-pin 84 relative to the head 72. As the spherical member 78 pivots on pin 84, the casing 36a, supporting plate 31a, spring 88, and prismatic mirror 34a pivot as a unit with it, from the FIGURE 8 to the FIGURE 9 position, and vice versa. The limited pivotal movement or first phase adjustment to either the two selective positions are defined by the angle Y shown in FIGURE 8.

For adjustment of the mirror unit as a whole, or first phase adjustment, the casing 36a, supporting plate 31a, spring 88 and prismatic mirror 34a will be moved relative to the spherical member 78 (rather than with it as previously described). To accomplish this a greater manual pressure of approximately ten p.s.i. is necessary to be applied to the mirror unit 30a to overcome the friction between the spring 88 and the spherical member 78, and this will permit movement of the spring 88 on the spherical member 78.

The modification shown in FIGURES 12 to 15 will now be described.

The rigid supporting arm 40b has secured to it a hemispherical shaped member 94 which extends into and through the socket opening 38b in the housing 36b of the mirror unit 30b. The front wall of the hemi-spherical shaped member is flat. The upper half 95 of the front wall is perpendicular to the axis of said member while the lower half 96 of said wall which is also flat extends inwardly or rearwardly at an inclined angle. A pair of spaced pins 98 are secured to the hemi-spherical shaped rear member 94, which pins extend forwardly thereof and have flat front ends with tapered front surfaces 99.

A hemi-spherical shaped front member 100 has a pair of spaced bores 102 alined with the pins. The bores are of annular shape and have generally V-shaped inner end walls 103. The said bores are of a circumference slightly larger than the tapered ends of the pins so that the front hemi-spherical member 100 can pivot on said pins 98 to either of the two selective positions shown in FIGURES 12 and 13.

The spring member 104 is secured to the bosses 42b of the housing 36b by fastening elements 46b. The spring 104 extends across the front of the hemi-spherical member 100 and provides a pressure contact with same. Pivoting or tilting of the mirror unit 30b to either of the two selective positions shown in FIGURES 12 and 13, or first phase adjustment, for changing the position of the prismatic mirror vertically is effected by applying a slight manual pressure on the mirror unit 30b. Since the friction between the spring 104 and the front hemi-spherical member 100 is greater than the friction between the hemi-spherical front member 100 and pins 98, a slight manual pressure of approximately three p.s.i. on the mirror unit 30b will cause the front spherical member 100 to pivot or rock on the pins 98. The supporting plate 31b, prismatic mirror 34b, housing 36b and spring 104 move as a single unit with the pivotal movement of the front hemi-spherical member 100 and thereby change the angle of the prismatic mirror. The degree of tilt between the two in a vertical direction is defined by the angle Z shown in FIGURE 12.

For adjusting the mirror unit as a whole, or a first phase adjustment, the casing 36b, supporting plate 31b, prismatic mirror 34b, and spring 104 will be moved relative to the hemi-spherical member 100 (rather than with it as previously described). To accomplish this, a greater manual pressure of approximately ten p.s.i. is necessary to be applied to the mirror unit 31b to overcome the friction between the spring 104 and hemi-spherical member 100, and this will permit movement of the spring 104 on the spherical member 100.

FIGURES 16 to 19 inclusive show another modification.

The rigid supporting arm or stem 40c has at the front thereof a generally hemi-spherical shaped member 106 which extends into and through the socket opening 38c in the housing 36c of mirror unit 30c. The upper half flat front wall 108 of said member is perpendicular to the axis of said member, while the lower front half wall 110, also flat, inclines or tapers rearwardly. A V-shaped recess 112 is provided centrally in said member 106 alined with the axis of said member. The rear hemi-spherical shaped member 106 has a pin 114 which extends into the V-shaped recess 112 and slightly forwardly thereof to pivotally support the front hemi-spherical shaped member 116. The front hemi-spherical shaped member 116 has a centrally positioned generally V-shaped boss 118 extending rearwardly of the rear flat wall 120 of member 116. Said rear wall 120 is perpendicular to the axis of member 116. The boss 118 is bifurcated as at 122 to accommodate the pin 114. The pin 114 has a smaller cross-section than the bifurcation 122 and the top and bottom walls of the V-shaped boss 118 are inclined at a lesser angle than the V-shaped recess 112 to permit pivoting of the front hemi-spherical member 116 with respect to the rear hemi-spherical member 106.

A spring member 124 extends across the front of the hemi-spherical member 116 and has a concave seat 126 which has pressure contact with the front of the hemi-spherical member 116. The pressure contact between the spring member 124 and the front hemi-spherical member 116 is greater than the friction at the pivotal connection of the pin 114 and the boss connection 118. Thus, a slight manual pressure of approximately three p.s.i. on the mirror unit 30c will cause the front spherical member 116 to pivot or rock on the pin 114 and boss 118. The supporting plate 31c, prismatic mirror 34c, housing 36c, and spring 124 move as a single unit with the pivotal movement of the front hemi-spherical member 116. The degree of tilt between the front hemi-spherical member 116 and the rear hemi-spherical member 106 in a vertical direction is defined by the angle U shown in FIGURE 16.

For an adjustment of the mirror unit as a whole, or a first phase adjustment, the casing 36c and spring 124 will be moved as a unit relative to the front hemi-spherical member 116 (rather than with it as previously described). To accomplish this a greater manual pressure of approximately ten p.s.i. is necessary to be applied to the mirror unit 31c to overcome the friction between the spring 124 and hemi-spherical member 116 and this will permit movement of the spring 124 on the front hemi-spherical member 116.

FIGURES 20 to 23 inclusive show a further embodiment.

This embodiment is generally similar to that shown in FIGURES 16 to 19 inclusive, except that it eliminates the pin 114 and cooperating bore in the rear and front hemi-spherical members respectively. The rear hemi-spherical member 130 is like the rear hemi-spherical member 106 of FIGURES 16 to 18, except that it eliminates the pin 114 and cooperating bore of said figures. The front hemi-spherical member 132 is like the front hemi-spherical member 100 of said figures, except that it eliminates the bifurcation 122 for the pin 114 of said figures. The spring 124′ engaging the hemi-spherical member 132 is identical to said figures. The like parts which were described in detail in FIGURES 16 to 19 will be given the numbers of FIGURES 16 to 19, followed by a prime and will not be redescribed in detail.

The friction between the spring member 124′ and the front hemi-spherical member 132 is greater than the friction at the pivotal connection of the boss 118′ and recess 112′ connection. Thus, a slight manual pressure of approximately three p.s.i. on the mirror unit 30d will cause the front spherical member 132 to pivot or rock on the boss 118′. The supporting plate 31d, prismatic mirror 34d, housing 36d and spring 124′ move as a single unit with the pivotal movement of the front hemi-spherical member 132. This is the second phase adjustment. The degree of tilt between the front hemi-spherical member 132 and the rear hemi-spherical member 130 in a vertical direction is defined by the angle W shown in FIGURE 20.

For adjustment of the mirror unit as a whole, or a first phase adjustment, the casing 36d, supporting plate 31d, prismatic mirror 34d and spring 124′ will be moved as a unit relative to the front hemi-spherical member 132 (rather than with it is previously described). To accomplish this a greater manual pressure of approximately ten p.s.i. is necessary to be applied to the mirror unit 31d to overcome the friction between the spring 124′ and hemi-spherical member 132 and this will permit movement of the spring 124′ on the hemi-spherical front member 132.

It will be understood that various changes and modifications may be made from the foregoing without departing from the spirit and scope of the appended claims.

What is claimed is:

1. An adjustable anti-glare rear vision mirror comprising a mirror unit which includes a reflective mirror, a support to which said mirror is fixedly secured and a casing whereby said mirror, support and casing move together as a unit, a stem having means for securement to an automobile or the like, said stem extending into said casing, means within said casing for supporting the mirror unit for two separate phases of adjustment by the application of manual force applied against the mirror unit, said last mentioned means including a pivotal member pivotally mounted on said stem within said casing for pivotal movement to one of two selective positions relative to said stem, a single spring member within said casing and secured thereto to move with said casing, said single spring member applying a pressure which coacts with the pivotal member and stem to control the two separate phases of adjustment of said mirror unit, said single spring member applying friction sufficient to maintain the mirror unit as a whole in a first phase adjusted position whereby said mirror unit may be adjusted as a whole to such an angle and level as to properly reflect the view from the rear of the automobile by the application of a manual force applied against the mirror unit, said single spring member controlling the friction of the second phase adjustment, namely, the pivotal movement of said pivotal member between two selective positions relative to said stem by the application of a manual force applied to the mirror unit for the purpose of providing reflected images of different intensities without disturbing the first phase adjusted position, said pivotal movement between the two selective positions being effected by a lesser manual force than the force necessary to effect the first phase adjustment.

2. A structure defined in claim 1, in which the single spring member is a flat spring.

3. A structure defined in claim 1, in which the single spring member is a flat spring having a socket-shaped portion which engages an arcuate-shaped portion on the stem.

4. A structure defined in claim 1, in which the pivotal member is of a generally spherical shape.

5. A structure defined in claim 1, in which the pivotal member on the stem is in frictional engagement with the housing.

6. A structure defined in claim 1, in which the stem has an arcuate-shaped front portion and in which the spring is a flat spring having a socket in engagement with the arcuate-shaped front portion.

7. A structure defined in claim 1, in which the pivotal member engages the spring member.

8. A structure defined in claim 1, in which the single spring member is a flat spring having a socket portion engaging an arcuate-shaped portion on the pivotal member.

9. A structure defined in claim 1, in which the pivotal member is of a parti-spherical shape.

10. A structure defined in claim 1, in which the pivotal member has a parti-spherical shape and is in engagement with the spring member which is a flat spring.

11. An adjustable anti-glare rear vision mirror comprising a mirror unit which includes a reflective mirror, a support to which said mirror is fixedly secured and a casing whereby said mirror, support and casing move together as a unit, a stem having means for securement to an automobile or the like, said stem extending into said casing, means within said casing for supporting the mirror unit for two separate phases of adjustment by the application of manual force applied against the mirror unit, said last mentioned means including a generally spherical-shaped member mounted on said stem within said casing for pivotal movement to one of two selective positions relative to said stem, a single spring member within said casing and secured thereto to move with said casing and in engagement with the front of said stem, said single spring member acting by applying friction to control the two separate phases of adjustment of said mirror unit, said single spring member applying a friction sufficient to maintain the mirror unit as a whole in a first phase adjusted position with said casing in frictional contact with said spherical pivotal member and said spring member in frictional contact with the front portion of said stem, whereby said mirror unit may be adjusted as a whole to such an angle and level as to properly reflect the view from the rear of an automobile by the application of a manual force against the mirror unit, said single spring member also controlling the friction of the second phase adjustment, namely, the pivotal movement of said spherical member between two selected positions relative to said stem by the application of a manual force applied to the mirror unit for the purpose of providing reflected images of different intensities without disturbing the first phase adjusted position, said pivotal movement between two selective positions being effected by a lesser manual force than the force necessary to effect the first phase adjustment.

12. A structure defined in claim 11, in which the spring member is a flat spring.

13. A structure defined in claim 12, in which the front of the stem has an arcuate shape and the portion of the spring in engagement therewith has a socket to receive said arcuate portion.

14. An adjustable anti-glare rear vision mirror comprising a mirror unit which includes a reflective mirror, a support to which said mirror is fixedly secured and a casing whereby said mirror, support and casing move together as a unit, a stem having means for securement to an automobile or the like, said stem extending into said casing, means within said casing for supporting the mirror unit for two separate phases of adjustment by the application of manual force applied against the mirror unit, said last mentioned means including a pivotal member pivotally mounted on said stem within said casing for pivotal movement to one of two selective positions relative to said stem, a single spring member within said casing and secured thereto to move with said casing, said single spring member acting to control the two separate phases of adjustment of said mirror unit, means on said stem in frictional engagement with the rear of said casing, said single spring member applying a friction sufficient to maintain the mirror unit as a whole in a first phase adjusted position whereby said mirror may be adjusted as a whole to such an angle and level as to properly reflect the view from the rear of an automobile by the application of a manual force against the mirror unit, said single spring member engaging said pivotal member, said single spring member controlling the friction of the second phase adjustment, namely, the pivotal movement of said pivotal member between two selective positions relative to said stem by the application of a manual force applied to the mirror unit for the purpose of providing reflected images of different intensities without disturbing the first phase adjusted position, said pivotal movement between the two selective positions being effected by a lesser manual force than the force necessary to effect the first phase adjustment.

15. A structure defined in claim 14, in which the single spring member is a flat spring.

16. A structure defined in claim 14, in which the pivotal member has a parti-spherical portion and the single spring member is a flat spring having a socket portion in engagement with said parti-spherical portion.

References Cited by the Examiner

UNITED STATES PATENTS 2,616,335  11/1952  Mazur _____ 88—98

FOREIGN PATENTS 966,197  7/1957  Germany.

JEWELL H. PEDERSEN, *Primary Examiner.*

J. K. CORBIN, *Assistant Examiner.*